(12) United States Patent
Nakatani et al.

(10) Patent No.: US 11,989,693 B2
(45) Date of Patent: May 21, 2024

(54) IMAGE-PROCESSING DEVICE, IMAGE PROCESSING METHOD, AND STORAGE MEDIUM ON WHICH PROGRAM IS STORED

(71) Applicant: NEC CORPORATION, Tokyo (JP)

(72) Inventors: Yuichi Nakatani, Tokyo (JP); Katsuhiko Kondoh, Tokyo (JP); Satoshi Segawa, Tokyo (JP); Michiru Sugimoto, Tokyo (JP); Yasushi Hidaka, Tokyo (JP); Junya Akiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 783 days.

(21) Appl. No.: 17/043,360

(22) PCT Filed: Mar. 26, 2019

(86) PCT No.: PCT/JP2019/012937
§ 371 (c)(1),
(2) Date: Sep. 29, 2020

(87) PCT Pub. No.: WO2019/194029
PCT Pub. Date: Oct. 10, 2019

(65) Prior Publication Data
US 2021/0027052 A1    Jan. 28, 2021

(30) Foreign Application Priority Data
Apr. 2, 2018  (JP) .................. 2018-071146

(51) Int. Cl.
*G06Q 10/10*    (2023.01)
*G06N 20/00*    (2019.01)
(Continued)

(52) U.S. Cl.
CPC ............. *G06Q 10/10* (2013.01); *G06N 20/00* (2019.01); *G06V 10/10* (2022.01); *G06V 30/412* (2022.01); *G06V 30/414* (2022.01); *G06V 30/416* (2022.01)

(58) Field of Classification Search
CPC ........ G06Q 10/10; G06N 20/00; G06V 10/10; G06V 30/412; G06V 30/414; G06V 30/416; G06T 7/00
See application file for complete search history.

(56) References Cited

U.S. PATENT DOCUMENTS 5,923,792 A * 7/1999 Shyu ................... G06V 10/987
                                                              382/309
8,331,739 B1 * 12/2012 Abdulkader ......... G06V 30/248
                                                              358/1.11
(Continued)

FOREIGN PATENT DOCUMENTS

JP    2008-27133 A    2/2008
JP    2011-150626 A   8/2011
(Continued)

OTHER PUBLICATIONS

Extended European Search Report for EP Application No. EP19780888.4 dated Mar. 29, 2021.
(Continued)

*Primary Examiner* — Dhaval V Patel

(57) ABSTRACT

An image-processing device includes: an acquisition unit configured to acquire form image data generated as an optical reading result of a form image; a group-specifying unit configured to determine whether kinds of groups into which the form image data is grouped are specifiable; and a work target determination unit configured to determine that the form image data is the form image data on which checking work for the kinds of groups is required when the kinds of groups of the form image data are determined to be unspecifiable.

13 Claims, 11 Drawing Sheets

(51) Int. Cl.
   *G06V 10/10*   (2022.01)
   *G06V 30/412*  (2022.01)
   *G06V 30/414*  (2022.01)
   *G06V 30/416*  (2022.01)

(56) References Cited

U.S. PATENT DOCUMENTS

| | | | |
|---|---|---|---|
| 9,576,272 B2 * | 2/2017 | Macciola | G06V 20/62 |
| 2002/0181777 A1 | 12/2002 | Sumikawa et al. | |
| 2013/0188872 A1 * | 7/2013 | Masuko | G06V 30/224 |
| | | | 382/182 |
| 2014/0369602 A1 * | 12/2014 | Meier | G06V 30/412 |
| | | | 382/182 |
| 2016/0055376 A1 * | 2/2016 | Koduru | G06V 30/412 |
| | | | 382/176 |

FOREIGN PATENT DOCUMENTS

| | | |
|---|---|---|
| JP | 2012-198684 A | 10/2012 |
| JP | 2015-11588 A | 1/2015 |
| JP | 2015-222556 A | 12/2015 |
| JP | 2016-27442 A | 2/2016 |
| JP | 2016-048444 A | 4/2016 |

OTHER PUBLICATIONS

International Search Report of PCT/JP2019/012937 dated May 14, 2019 [PCT/ISA/210].
Notice of Reasons for Refusal dated Dec. 15, 2020 from the Japanese Patent Office in Application No. 2018-071146.
Singapore Office Action for SG Application No. 11202009541R dated Jun. 14, 2022.

* cited by examiner

FIG. 5

<RECORD TABLE>

| FORM ID | IMAGE DATA | RECORD CHARACTER STRING 1 | RECORD CHARACTER STRING 2 | RECORD CHARACTER STRING 3 | RECORD CHARACTER STRING 4 |
|---|---|---|---|---|---|
| ... | ... | ... | ... | ... | ... |
| ... | ... | ... | ... | ... | ... |
| ... | ... | ... | ... | ... | ... |

IMAGE-PROCESSING DEVICE, IMAGE PROCESSING METHOD, AND STORAGE MEDIUM ON WHICH PROGRAM IS STORED

CROSS REFERENCE TO RELATED APPLICATIONS

This application is a National Stage of International Application No. PCT/JP2019/012937, filed Mar. 26, 2019, claiming priority to Japanese Patent Application No. 2018-071146, filed Apr. 2, 2018, the contents of all of which are incorporated herein by reference in their entirety.

TECHNICAL FIELD

The present invention relates to an image-processing device, an image processing method, and a storage medium on which a program is stored.

BACKGROUND ART

There is an image-processing device that performs an optical character recognition (OCR) process on an image of a form in which a document acquired using a scanner or the like to read the document described in the image of the form. When the number of formats of forms is various, precision of the OCR process is improved by storing information regarding format definition of the forms in advance in such an image-processing device and specifying a reading target region. A related technology is disclosed in Patent Document 1.

CITATION LIST

Patent Literature

[Patent Document 1]
Japanese Unexamined Patent Application, First Publication No. 2016-48444

SUMMARY OF THE INVENTION

Problems to be Solved by the Invention

Incidentally, in the above-described image-processing device, a group of images of newly acquired forms is specified and a process is performed in accordance with the specified group. For example, when a form image used for a customs service is determined to be a form image specified in a predetermined group, a registered customs specialist is requested to perform work of a customs service based on the form images. When the form image is not determined to be the form image specified in the predetermined group, an operator such as a key puncher who creates a form image is requested to re-perform registration or the like of character information so that the form image is suitable as a form image used for customs work. In a device performing such a process, a process of specifying a group of images of forms is performed using a machine learning result of the images. However, a group of images of forms for which precision of the machine learning is low or images of forms for which no machine learning has been performed cannot be specified. For images of forms of which such a group cannot be specified, it is necessary for an operator who performs machine learning (the above-described key puncher or the like) to perform work. However, due to the effort required to perform the work, it is necessary to present the work to the operator as work to be performed with priority by the operator An example objective of the present invention is to provide an image-processing device, an image processing method, and a program capable of solving the above-described problems.

Means for Solving the Problems

According to a first aspect of the present invention, an image-processing device includes: an acquisition unit configured to acquire form image data generated as an optical reading result of a form image; a group-specifying unit configured to determine whether kinds of groups into which the form image data is grouped are specifiable; and a work target determination unit configured to determine that the form image data is the form image data on which checking work for the kinds of groups is required when the kinds of groups of the form image data are determined to be unspecifiable.

According to a second aspect of the present invention, an image processing method includes: acquiring form image data generated as an optical reading result of a form image; determining whether a kind of group into which the form image data is grouped is specifiable; and determining that the form image data is the form image data on which work of checking the kind of group is required when the kind of group of the form image data is determined to be unspecifiable.

According to a third aspect of the present invention, a storage medium stores a program causing a computer of an image-processing device to perform processing of: acquiring form image data generated as an optical reading result of a form image; determining whether a kind of group into which the form image data is grouped is specifiable; and determining that the form image data is the form image data on which work of checking the kind of group is required when the kind of group of the form image data is determined to be unspecifiable.

Advantageous Effects of Invention

According to the present invention, it is possible to output the work for checking an image of a form of which a group cannot be specified as work to be preliminarily performed by the operator.

BRIEF DESCRIPTION OF THE DRAWINGS

FIG. 5 is a diagram illustrating an overview of a data table stored in a database according to the embodiment according to the present invention.

EXAMPLE EMBODIMENT

Hereinafter, an image-processing device according to an embodiment of the present invention will be described with reference to the drawings.

Figure 1:
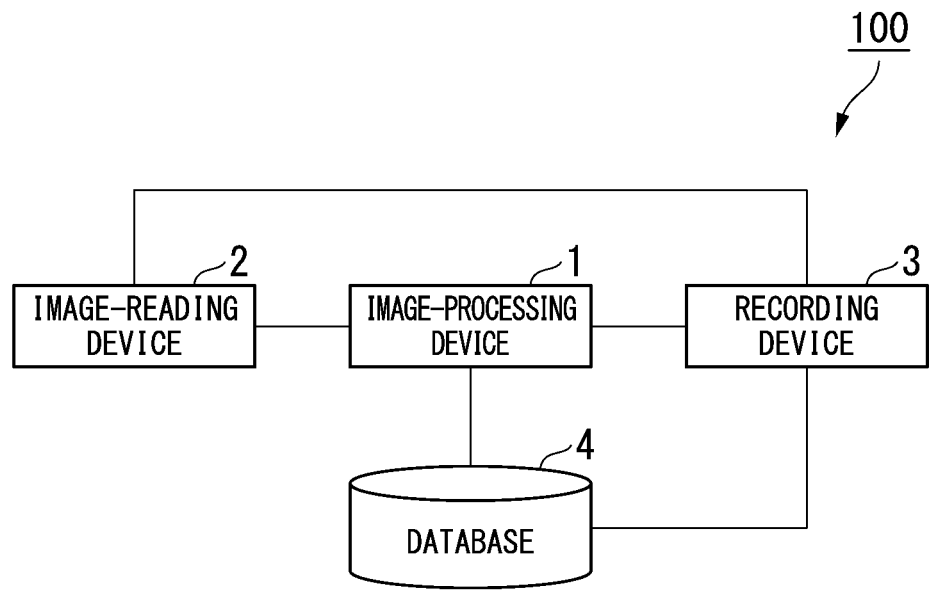
FIG. 1 is a diagram illustrating an overview of an image processing system including an image-processing device according to an embodiment according to the present invention.

FIG. 1 is a diagram illustrating an overview of an image processing system including an image-processing device according to an embodiment.

As illustrated in FIG. 1, an image processing system 100 includes an image-processing device 1, an image-reading device 2, a recording device 3, and a database 4.

The image-processing device 1 is connected to the image-reading device 2 via a communication cable. The image-reading device 2 optically acquires image data such as document forms or the like and outputs the image data to the image-processing device 1. The image-processing device 1 performs an optical character recognition (OCR) process on the image data of the document form to recognize characters. The image-processing device 1 outputs a character recognition result to the recording device 3 and the recording device 3 records the character recognition result on a database.

The database 4 is connected to the image-processing device 1 and the recording device 3. The database 4 stores a correspondence relation between image data of a plurality of document forms previously registered by the recording device 3 and record character strings indicating character strings which are recording targets among character strings included in the image data. The character strings indicated by the record character strings are important character strings which have to be recorded and stored on the database 4 among the character strings described in document forms. An operator who uses the image processing system 100 records image data of a plurality of document forms previously registered and record character strings among character strings included in the image data, on the database 4 in advance using the recording device 3.

The correspondence relation between image data of the document forms and information regarding the record character strings indicating character strings which are recording targets among information regarding character strings included in the image data is assumed to be recorded sufficiently on the recording device 3 with regard to many document forms. In this state, the image-processing device 1 performs a process.

Figure 2:
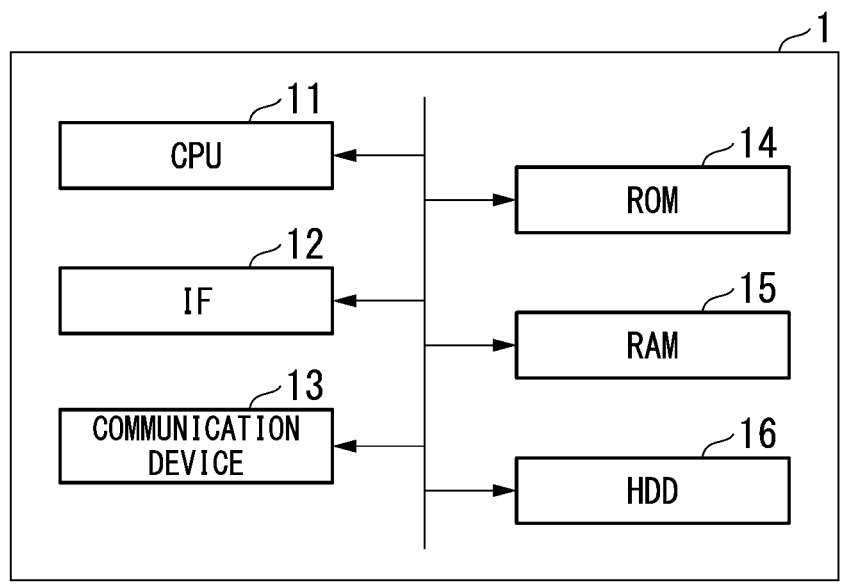
FIG. 2 is a diagram illustrating a hardware configuration of the image-processing device according to the embodiment according to the present invention.

FIG. 2 is a diagram illustrating a hardware configuration of the image-processing device.

As illustrated in FIG. 2, the image-processing device 1 is a computer that includes a central processing unit (CPU) 11, an interface (IF) 12, a communication module 13, a read-only memory (ROM) 14, a random access memory (RAM) 15, a hard disk drive (HDD) 16. The communication module 13 may perform wireless communication or wired communication with the image-reading device 2, the recording device 3, and the database 4 and may have two function thereof.

Figure 3:
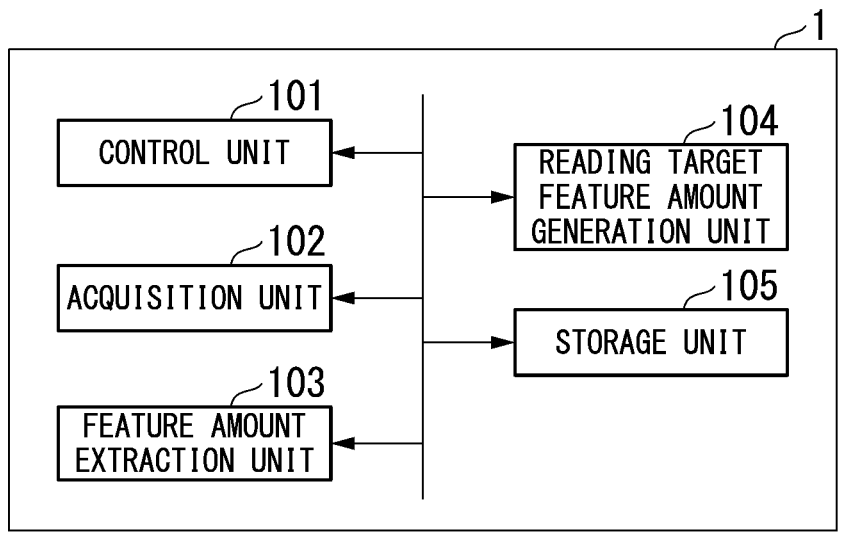
FIG. 3 is a first diagram illustrating a functional block of an image-processing device according to the embodiment according to the present invention.

FIG. 3 is a first diagram illustrating a functional block of the image-processing device.

The CPU 11 of the image-processing device 1 executes a stored program to realize functions of a control unit 101, an acquisition unit 102, a feature amount extraction unit 103, a reading target feature amount generation unit 104, and a recording unit 105.

The control unit 101 controls the other functional units.

The acquisition unit 102 acquires image data of a document form.

The feature amount extraction unit 103 extracts first feature amounts indicating features of a record character string included in the image data of the document form for each piece of image data of the document form based on a recognition result of the image data of the plurality of document forms.

The reading target feature amount generation unit 104 generates a reading target feature amount of the record character string using the first feature amounts corresponding to the image data of the document form.

The recording unit 105 extracts and records a record character string among information regarding character strings read from image data of new document forms by using reading target feature amounts in image data of the new document forms.

Through such a process, the image-processing device 1 reduces the effort required to record the character string information to be recorded included in the image data of a new document form.

Figure 4:
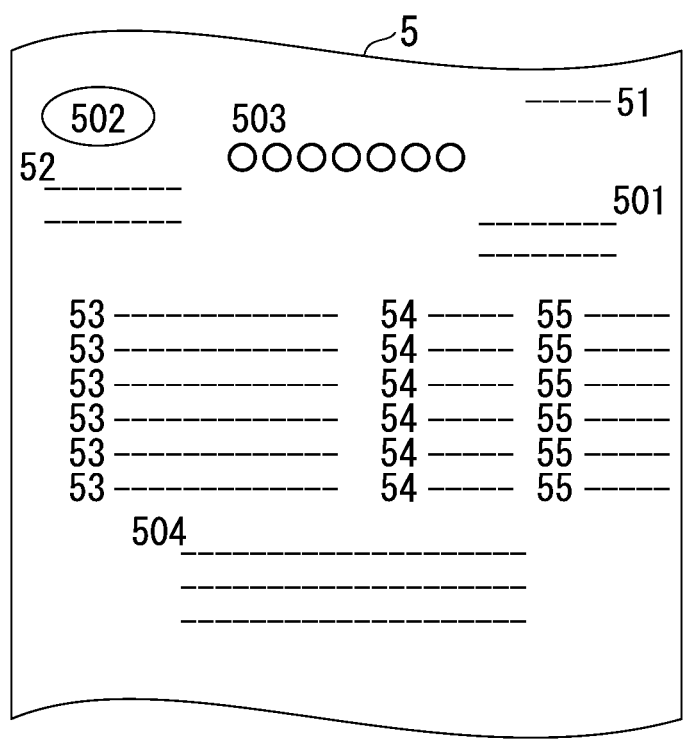
FIG. 4 is a diagram illustrating an example of a document form according to the embodiment according to the present invention.

FIG. 4 is a diagram illustrating an example of a document form.

As illustrated in FIG. 4, in the document form, for example, a mark of a company generating the document, a creation date, a person in charge of creation, document content, and the like describe a format specific to the document form. The document content indicates a pair or a plurality of pairs of pieces of information such as names of ordered commodity and the number of ordered commodities, for example, when the document form is an order paper. The operator records a specific record character string to be recorded among character strings described in the document form on the database 4 based on one certain document form using the recording device 3. Specifically, the operator inputs the specific record character string which the recording device 3 will record on the database 4, while seeing the document form. The operator causes the image-reading device 2 to read image data of the document form. The image-reading device 2 reads the document form based on an operation by the operator and outputs the document form to the image-processing device 1. Then, the recording device 3 records the image data of one document form and a specific record character string to be recorded among character strings described in the document form on the database 4 in association therewith based on the operation by the operator and control of the image-processing device 1.

In the example of FIG. 4, a date and time 51, an order organization 52, a commodity name 53, a quantity 54, and an amount of money 55 are specific record character strings to be recorded. In the document form 5, other information such as a non-record character string which is not recorded by the operator is also printed. The information is, for example, a name 501 of an ordering party who issues the document form, an emblem image 502 of the ordering party, a title 503 of the document form, and a greeting 504.

FIG. 5 is a diagram illustrating an overview of a data table stored in a database.

As illustrated in FIG. 5, the database 4 stores a record table in which image data of a document form is stored in association with a specific record character string to be recorded among character strings described in the document form.

Figure 6:
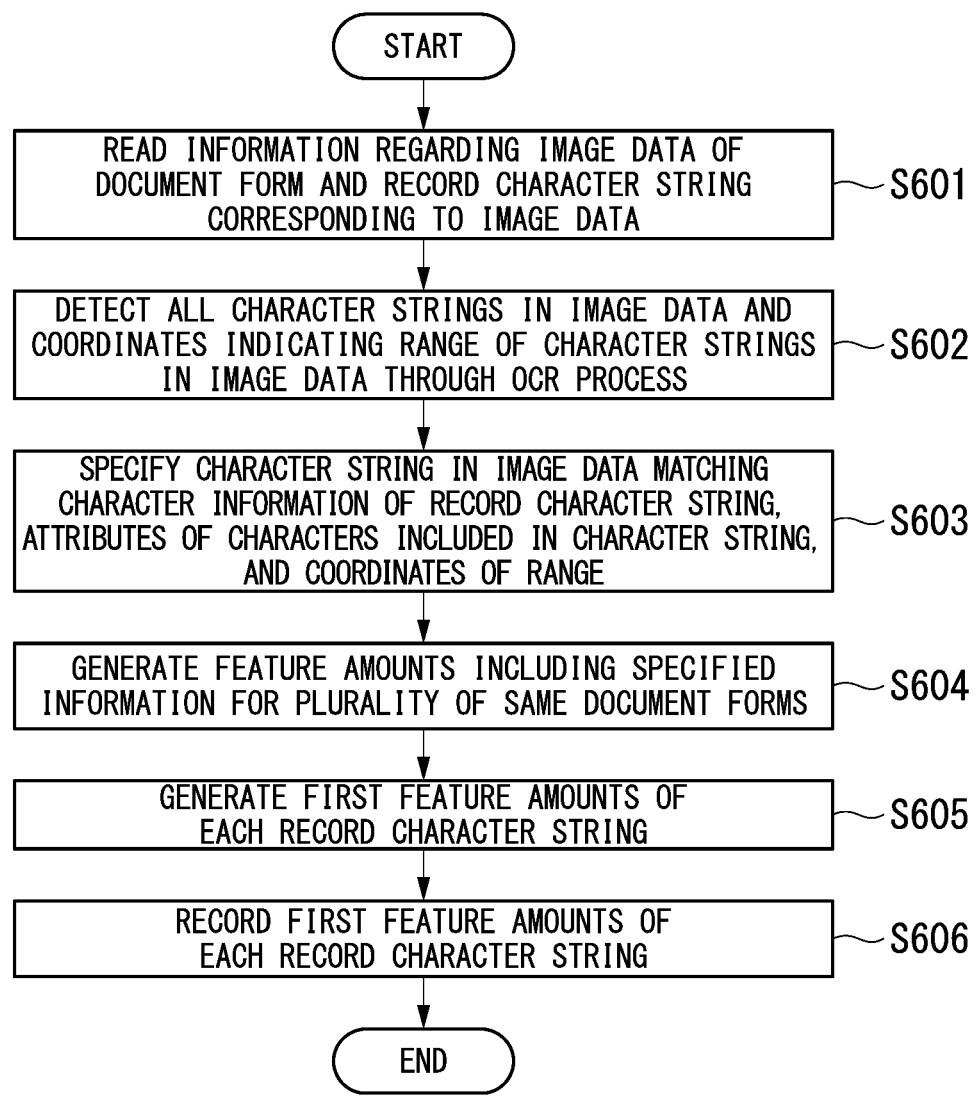
FIG. 6 is a first diagram illustrating a processing flow of the image-processing device according to the embodiment according to the present invention.

FIG. 6 is a first diagram illustrating a processing flow of the image-processing device according to the first embodiment.

Next, a processing flow of the image-processing device 1 will be described in order.

First, in the database 4, a plurality of combinations of image data of certain document forms and a specific record character string described in the document form are recorded for the number of a plurality of same document forms. For example, a plurality of pieces of specific record character string information regarding the format of the document form 5 illustrated in FIG. 4 are assumed to be recorded for the number of the plurality of same document forms. In this state, the operator activates the image-processing device 1 and instructs the image-processing device 1 to start a process.

The acquisition unit 102 of the image-processing device 1 reads the image data of the document form 5 and information regarding the record character string corresponding to the image data from the database 4 (step S601). The acquisition unit 102 outputs the image data and the record character string to the feature amount extraction unit 103. The feature amount extraction unit 103 detects all the character strings in the image data and coordinates indicating a range of the character strings in the image data by performing an OCR process on the image data (step S602). The character string is a unity of characters formed by a plurality of characters. The feature amount extraction unit 103 analyzes the range of one unity in accordance with an interval or the like from other characters, extracts one character or a plurality of characters included in the range as a character string, and detects coordinates indicating the range of the character string in the image data. The characters included as the character string may include signs such as ideographs or phonographs, marks, and icon images.

The feature amount extraction unit 103 compares the character string extracted from the image data through the OCR process with the record character string read from the database 4 along with the image data. The feature amount extraction unit 103 specifies the character string in the image data matching character information of the record character string among the character strings extracted from the image data through the OCR process, attributes of characters included in the character string, and the coordinates of the range (step S603). The attributes of the characters are information expressed by numbers, alphabetical letters, hiragana letters, kanji, the number of characters, character heights, and fonts. The coordinates of the range of the character string are information indicating coordinates of a first character, coordinates of an end character, or the like included in the character string. The feature amount extraction unit 103 generates the feature amounts including the specified information for the plurality of same document forms 5 (step S604).

The feature amount extraction unit 103 generates the feature amounts for each record character string in the document form 5. The reading target feature amount generation unit 104 acquires the feature amounts in the plurality of same document forms 5, analyzes the attributes of the characters included in each of the feature amounts corresponding to the record character string and coordinates indicating the range of the character string, and generate each feature amount. The feature amounts are, for example, values that quantitatively indicates predetermined features of the record character string, related to the format in the document image 5. The feature amounts are analyzed through processing such as machine learning. The feature amounts generated by the reading target feature amount generation unit 104 through analysis of the machine learning or the like are referred to as first feature amounts. That is, the reading target feature amount generation unit 104 generates, respectively, the first feature amounts of record character strings in the document form 5 using the plurality of same document forms 5 (step S605).

The first feature amounts are feature amounts for recognizing the record character string and include attributes of characters and coordinates indicating a range of a character string. The reading target feature amount generation unit 104 records the first feature amounts of one record character string or a plurality of record character strings in the document form 5 in association with an identifier of the document form 5 on the database 4 (step S606).

For example, the reading target feature amount generation unit 104 records the first feature amounts indicating the character attributes, the coordinates indicating the range of the character string, or the like of each of the date and time 51, the order organization 52, the commodity name 53, the quantity 54, and the amount of money 55 which are a record character string included in the document form 5 on the database 4 in association with an identifier of the document form 5.

Through the above process, the image-processing device 1 can generate the information (the first feature amounts) used to reduce the effort required to record the record character strings of the operator through machine learning or the like and accumulate the information in the database 4. Thus, the image-processing device 1 can automatically record the record character strings on the database 4 based on image data of a new document form. The process will be described below.

Figure 7:
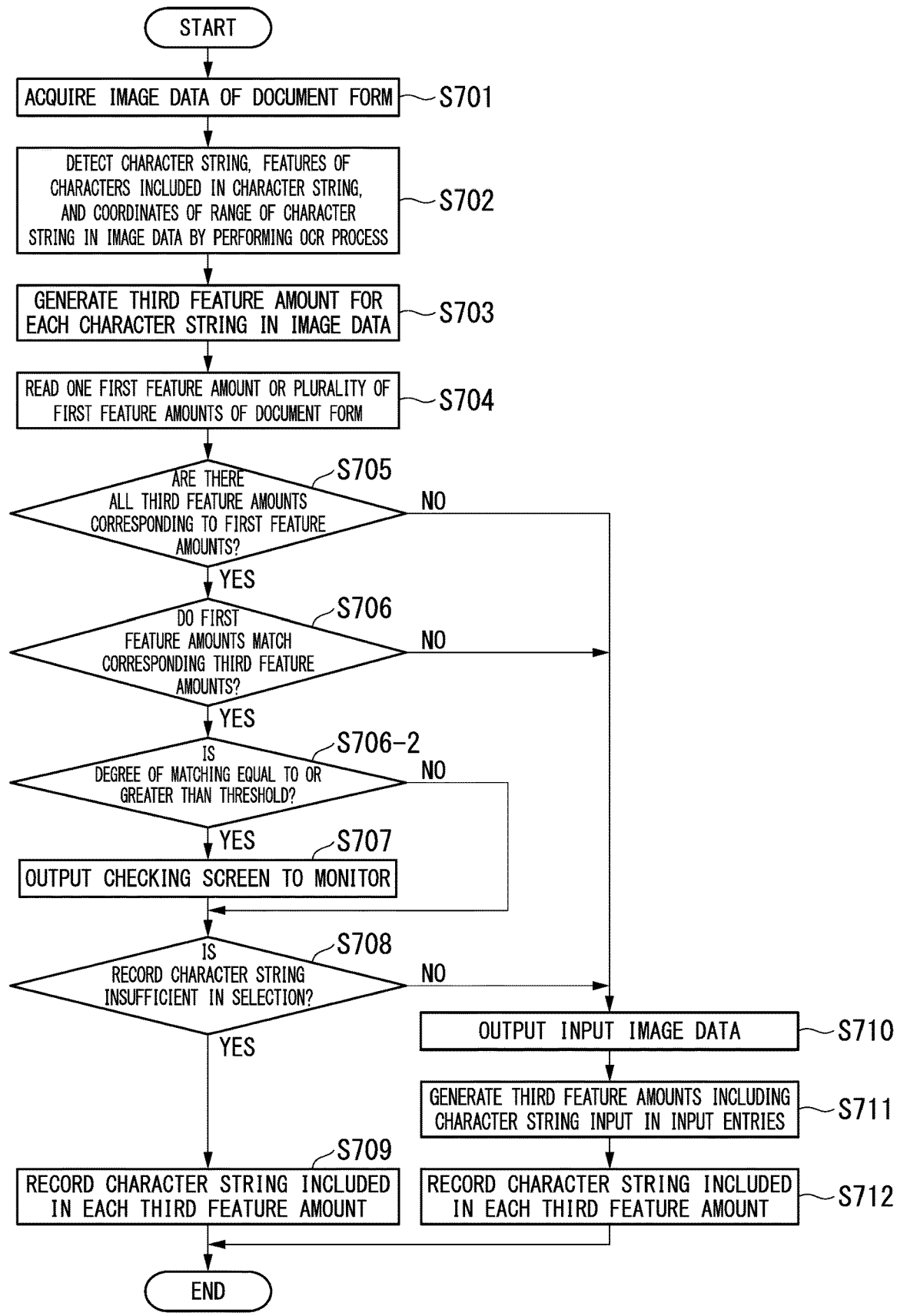
FIG. 7 is a second diagram illustrating a processing flow of the image-processing device according to the embodiment according to the present invention.

FIG. 7 is a second diagram illustrating a processing flow of the image-processing device according to the embodiment.

The operator performs an operation of causing the image-reading device 2 to read a new document form. Then, the image-reading device 2 generates the image data of the document form and outputs the image data to the image-processing device 1. The acquisition unit 102 of the image-processing device 1 acquires the image data (step S701). The acquisition unit 102 outputs the image data to the feature amount extraction unit 103. The feature amount extraction unit 103 detects a character string, the features of the characters included in the character string, and the coordinates of the range of the character string in the image data by performing the OCR process on the image data (step S702). The feature amount extraction unit 103 generates third feature amounts including the detected information for each character string in the image data (step S703). That is, the third feature amounts are information indicating the features of the character string included in the document form of the newly read image data.

Thereafter, the feature amount extraction unit 103 reads one first feature amount or the plurality of first feature amounts of the document form of processing target image data from the database 4 (step S704). The feature amount extraction unit 103 outputs the third feature amounts and the first feature amounts to the recording unit 105.

The recording unit 105 acquires the third feature amounts and one first feature amount or the plurality of first feature amounts with respect to one character string or a plurality of character strings in the image data. The recording unit 105 uses coordinates indicating the range of the character string included in each first feature amount to determine whether there are all the third feature amounts including coordinates corresponding to the coordinates indicated by each first feature amount. (step S705). When there are all the third feature amounts including the coordinates corresponding to the coordinates of the first feature amounts (YES in step S705) there is description of characters in all the entries in the document form corresponding to the recording character string. Conversely, when there are only some of the third feature amounts including the coordinates corresponding to the coordinates of the first feature amounts (NO in step S705), there is no description of the characters in any entry in the document form.

In the case of YES in step S705, the recording unit 105 determines whether each character attribute included in the first feature amount matches each character attribute included in the corresponding third feature amount specified based on the coordinates (step S706). The recording unit 105 determines whether the degree of matching between the character attributes included in the first feature amounts and the character attributes included in the third feature amounts is equal to or greater than a predetermined threshold (step S706-2).

When the degree of matching in the determination of step S706-2 is equal to or greater than the threshold (YES in step S706-2), the recording unit 105 generates a checking screen in which a rectangular frame is displayed in the range of the record character string based on the coordinates indicated by one third feature amount or the plurality of third feature amounts generated from the currently processed image data. The recording unit 105 generates a first folder in which the checking screen output to a work operator who performs work using the form image is stored and records the checking screen in the folder. The work operator may be, for example, a registered customs specialist when the document form is a form used for a customs service. The recording unit 105 outputs the checking screen to a motor (step S707). The work operator can check a rectangular region displayed on the checking screen and check a record character string which the image-processing device 1 will record.

Thus, the work operator can check whether the record character string is insufficient. An icon image of one of OK and NG buttons is displayed on the checking screen. The work operator can give an instruction indicating that the selected record character string is not insufficient by selecting the OK button among the icon images of the button. Conversely, the work operator can give an instruction indicating that the selected record character string is insufficient by selecting the NG button among the icon images of the button. The work operator may perform work of another work (custom clearance or the like) given to the work operator using the checking screen.

The reason for outputting the checking screen to the monitor will be described with reference to FIG. 4. In FIG. 4, six commodity names 53 are entered among the record character strings. When the entered six commodity names 53 was a maximum in a past document form, the commodity names 53 are automatically determined to be the record character strings within a range of 1 to 6 in a new document form. Accordingly, for example, when seven commodity names 53 are entered in the new document form, the first to sixth commodity names are all determined as YES in steps S705 and S706. Therefore, the image-processing device 1 may end without recording the seventh character string.

To ameliorate such an event, the image-processing device 1 displays the checking screen before the record character strings are recorded in step S707 to confirm with the work operator whether or not a processing may be ended after the recording.

The recording unit 105 determines whether the record character string is insufficient in the selection in response to pressing of the icon image of the button by the work operator (step S708). When the record character string is not insufficient (YES in step S708), the recording unit 105 records the character strings included in the third feature amounts in the record table in association with identification information of the document form (step S709).

For example, a case in which the third feature amount a3, the third feature amount b3, the third feature amount c3, and the third feature amount d3 can be acquired from the image data of the document form is an exemplary example. A case in which the third feature amount a3 matches the first feature amount a1 recorded in advance on a database, the third feature amount b3 matches the first feature amount b1, the third feature amount c3 matches the first feature amount c1, and the third feature amount d3 matches the first feature amount d1 is an exemplary example. In this case, the recording unit 105 records the character strings included in the third feature amount a3, the third feature amount b3, the third feature amount c3, and the third feature amount d3 in the record table of the document form.

When step S705 is NO, step S706 is NO, or step S708 is NO, as described above, the recording unit 105 performs a process in a case in which there are no third feature amounts including the coordinates corresponding to the coordinates indicated by the first feature amounts. Specifically, the recording unit 105 generates a work folder for a checking operator that checks a form image again. The recording unit 105 generates input image data of a form image in which input entries are provided in the range of the coordinates of the first feature amounts for which there are no third feature amounts at the corresponding coordinates in the image data and records the input image data in the work folder.

Thereafter, the control unit 101 outputs the input image data recorded, in response to an instruction by the checking operator, in the work folder to a terminal or the like operated by the checking operator (step S710). The checking operator may be, for example, a person who performs work such as a key puncher. The input image data may be data described in a markup language such as HTML or XML.

The operator operates an input device such as a keyboard of the image-processing device 1 to input record character strings in the input entries in the input image data displayed on the monitor while seeing the input image data. A save button is displayed in the input image data. When an operation of pressing the save button is performed, the recording unit 105 generates the third feature amounts including the character strings newly input in the input entries of the input image data in addition to the third feature amounts which have already been acquired with regard to the document form (step S711). The recording unit 105 records the identifier of the form image data and the character string input in the input entries on the database 4 in association therewith. The image-processing device 1 can extend the range of the character string recorded automatically, since the first feature amounts are updated by re-preforming the processing flow illustrated in FIG. 6. Thus, when the form document is processed subsequently in the same way, the character string is recorded automatically, and thus it is possible to reduce the effort required for the operator to input the character string.

The recording unit 105 records the character strings included in all the third feature amounts in the record table of the document form, respectively (step S712).

Through the process, the image-processing device 1 can automatically record the record character strings in the image data of a newly input document form in accordance with the record character strings and the image data of the document form recorded in advance by the operator. Accordingly, the image-processing device 1 can reduce the effort required for the operator to record the record character string in the document form.

Even though no record character string is entered in the document form, the image-processing device 1 outputs the input image data when there are no entries corresponding to the record character strings which had to be originally entered. Thus, it is possible to find a mistake which had not been input in the entries of the document form which had to be originally entered and easily record the record character strings indicated by the entries.

Figure 8:
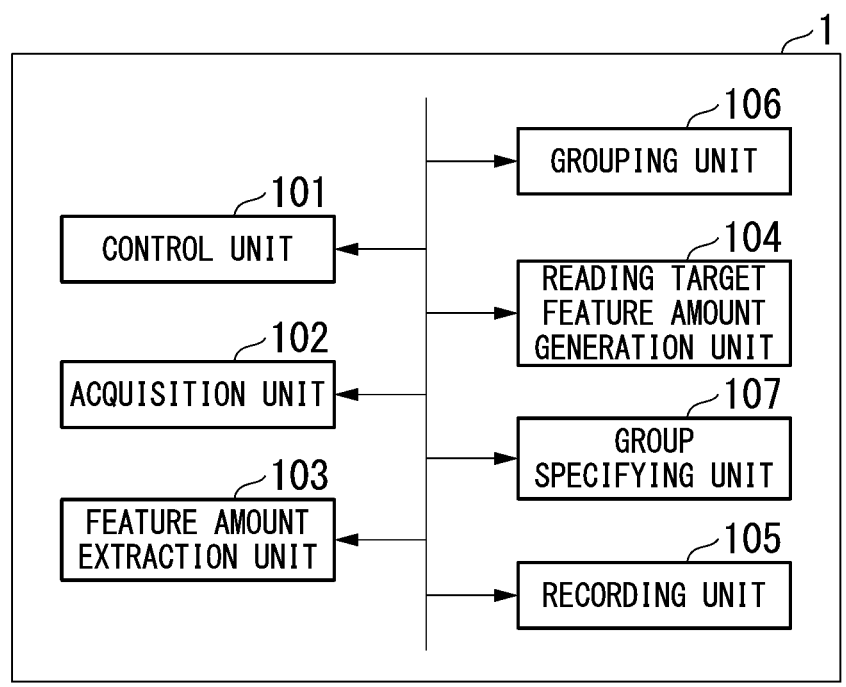
FIG. 8 is a second diagram illustrating a functional block of the image-processing device according to the embodiment according to the present invention.

FIG. 8 is a second diagram illustrating a functional block of the image-processing device according to the embodiment.

As illustrated in FIG. 8, the image-processing device 1 further has the functions of a grouping unit 106 and a group-specifying unit 107 in addition to each functional unit illustrated in FIG. 3. A hardware configuration of the image-processing device 1 is similar to the configuration illustrated in FIG. 2.

Figure 9:
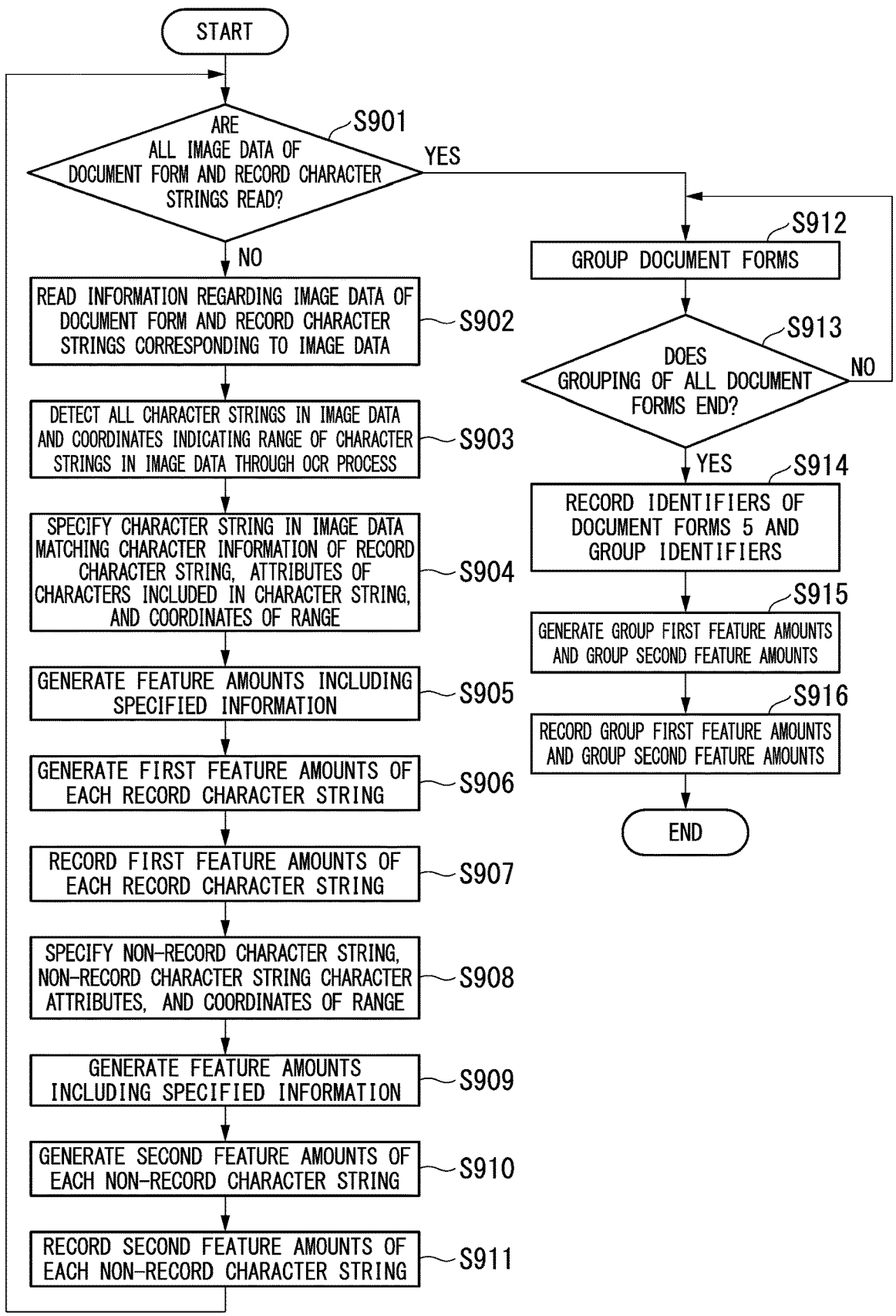
FIG. 9 is a third diagram illustrating a processing flow of the image-processing device according to the embodiment according to the present invention.

FIG. 9 is a third diagram illustrating a processing flow of the image-processing device according to the embodiment.

A plurality of combinations of image data of a plurality of different document forms and specific record character strings described in each document form are recorded for each document form on the database 4.

For example, a plurality of pieces of specific record character string information of each of the different document forms 5 illustrated in FIG. 4 are assumed to be recorded. In this state, the operator operates the image-processing device 1 and instructs the image-processing device 1 to start a process.

The acquisition unit 102 of the image-processing device 1 determines whether information regarding the image data of the document form 5 and the record character strings corresponding to the image data is all read from the database 4 (step S901). In the case of NO, the acquisition unit 102 reads the information regarding the image data of the document form 5 and the record character strings corresponding to the image data from the database 4 (step S902). The acquisition unit 102 outputs the image data and the record character strings to the feature amount extraction unit 103. The feature amount extraction unit 103 detects all the character strings in the image data and the coordinates in the image data by performing the OCR process on the image data (step S903). The character string is a unity of characters formed by a plurality of characters. The feature amount extraction unit 103 analyzes the range of one unity in accordance with an interval or the like from other characters, extracts one character or a plurality of characters included in the range as a character string, and detects coordinates indicating the range of the character string in the image data. The characters included as the character string may include signs such as ideographs or phonographs, marks, and icon images.

The feature amount extraction unit 103 compares the character string extracted from the image data through the OCR process with the record character string read from the database 4 along with the image data. The feature amount extraction unit 103 specifies the character string in the image data matching the character information of the record character string among the character strings extracted from the image data through the OCR process, the attributes of the characters included in the character string, and the coordinates of the range (step S904). The attributes of the characters are information expressed by numbers, alphabetical letters, hiragana letters, kanji, the number of characters, character heights, and fonts. The coordinates of the range of the character string are information indicating coordinates of a first character, coordinates of an end character, or the like included in the character string. The feature amount extraction unit 103 generates the feature amounts including the specified information with regard to one document form 5 (step S905).

The feature amount extraction unit 103 generates the feature amounts for each record character string in the document form 5. The reading target feature amount generation unit 104 acquires the feature amounts of the plurality of document forms 5, analyzes the attributes of the characters included in the feature amounts for each corresponding record character string and the coordinates indicating the range of the character string, and generate each feature amount. The feature amounts are analyzed through processing such as machine learning. As described above, the feature amounts generated by the reading target feature amount generation unit 104 through analysis of the machine learning or the like are referred to as first feature amounts. That is, the reading target feature amount generation unit 104 generates the first feature amounts of the record character string in the document form 5 using the plurality of same document forms 5 (step S906). The first feature amounts are feature amounts for recognizing the record character string and include attributes of characters and coordinates indicating a range of a character string. The reading target feature amount generation unit 104 records the first feature amounts of one record character string or a plurality of record character strings in the document form 5 on the database 4 in association with an identifier of the document form 5 (step S907).

For example, the reading target feature amount generation unit 104 records the first feature amounts indicating the character attributes, the coordinates indicating the range of the character string, or the like of each of the date and time 51, the order organization 52, the commodity name 53, the quantity 54, and the amount of money 55 which are a recording character string included in the document form 5 on the database 4 in association with an identifier of the document form 5.

The feature amount extraction unit 103 specifies a non-record character string in the image data which does not match character information included in the record character string, attributes of characters included in the non-record character string, and coordinates of the range (step S908). The feature amount extraction unit 103 generates the feature amounts including the specified information with regard to the document form 5 (step S909).

The feature amounts are generated for each non-record character string in the document form 5 by the feature amount extraction unit 103. The reading target feature amount generation unit 104 acquires the feature amounts in the plurality of same document forms 5, analyzes the attributes of the characters included in the feature amounts corresponding to the non-record character string and coordinates indicating the range of the character string, and generate each feature amount. These feature amounts are referred to as second feature amounts. That is, the reading target feature amount generation unit 104 generates the second features of each non-record character string in the document form 5 using the plurality of same document forms 5 (step S910). The second feature amounts are feature amounts for recognizing the non-record character string and include attributes of characters and coordinates indicating a range of a character string. The reading target feature amount generation unit 104 records the second feature amounts of one non-record character string or a plurality of non-record character strings in the document form 5 on the database 4 in association with an identifier of the document form 5 (step S911).

For example, the reading target feature amount generation unit 104 records the second feature amounts indicating a name 501 of an ordering party, an emblem image of the ordering party, a title 503 of the document form, and a greeting 504 which are a non-record character string included in the document form 5 on the database 4 in association with an identifier of the document form 5.

The information regarding the image data of the plurality of different pieces of document forms 5 and the record character string corresponding to the image data are recorded on the database 4. The acquisition unit 102 of the image-processing device 1 repeats the processes of steps S901 to S911 until the information regarding the image data and the record character string in all the document forms 5 is read. Then, the information is determined to be all read in step S901 (YES in step S901).

In this case, the grouping unit 106 groups the document forms 5 based on the second feature amounts included in the image data of the document form 5 (step S912). The group is, for example, a collection of the document forms for each format. For example, the grouping unit 106 groups the document forms 5 based on the degree of matching of the non-record character strings included in the second feature amounts, the degree of matching between the emblem images, the degree of matching between the coordinates of the range of the non-record character strings, or the like. For example, the grouping unit 106 groups the plurality of document forms 5 based on correlation of the second feature amounts between the plurality of document forms 5. For example, the grouping unit 106 groups the plurality of document forms 5 based on similarity of the second feature amounts between the plurality of document forms 5. The grouping unit 106 determines the group identifiers of the document forms 5 in the grouping process. The grouping unit 106 determines whether the grouping of all the document forms 5 ends (step S913).

The grouping unit 106 repeats the process of step S912 when the grouping of all the document forms 5 is not completed. When the grouping unit 106 completes the grouping of all the document forms 5 (YES in step S913), identifiers of the document forms 5 and group identifiers granted to the document forms 5 are recorded in a group table of the database 4 in association therewith (step S914).

Then, the reading target feature amount generation unit 104 reads each first feature amount and each second feature amount of one document form 5 or the plurality of document forms 5 belonging to a certain group from the database 4. The reading target feature amount generation unit 104 generates each group first feature amount and each group second feature amount corresponding to each first feature amount and each second feature amount of the document forms 5 belonging to the group (step S915).

Each group first feature amount may be a value such as an average of the first feature amounts of the document forms 5 belonging to the group. Similarly, each group second feature amount may be a value such as an average of the second feature amounts of the document forms 5 belonging to the group. Each group first feature amount and each group second feature amount may not be an average of the first feature amounts or an average of the second feature amounts. Each group first feature amount and each group second feature amount may be generated using any scheme as long as the feature amounts are feature amounts calculated so that the record character strings or the non-record character string of one document form 5 or the plurality of document forms 5 belonging to the group can be specified using a scheme such as predetermined statistical processing or machine learning.

The reading target feature amount generation unit 104 calculates each group first feature amount and each group second feature amount in each group and records each group first feature amount and each group second feature amount on the database 4 in association with the identifier of the group (step S916).

Through the above process, the image-processing device 1 can generate the information necessary to reduce the effort required to record the record character strings of the operator for each group of the document form and accumulate the information in the database 4. Thus, the image-processing device 1 can automatically record the record character strings on the database 4 based on image data of a new document form. The process will be described below.

Figure 10:
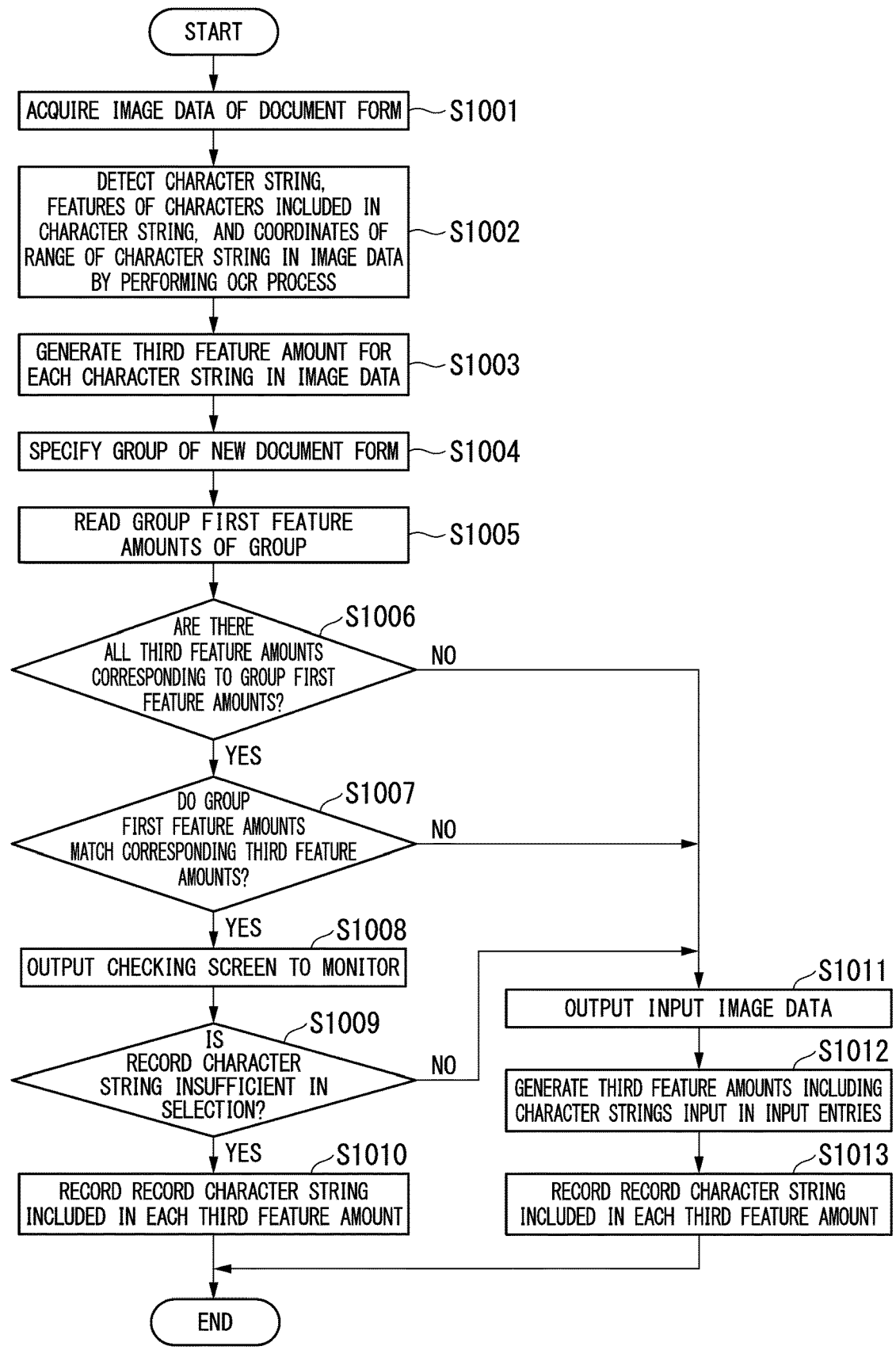
FIG. 10 is a fourth diagram illustrating a processing flow of the image-processing device according to the embodiment according to the present invention.

FIG. 10 is a fourth diagram illustrating a processing flow of the image-processing device according to the embodiment.

The operator performs an operation of causing the image-reading device 2 to read a new document form. Then, the image-reading device 2 generates the image data of the document form and outputs the image data to the image-processing device 1. The acquisition unit 102 of the image-processing device 1 acquires the image data (step S1001). The acquisition unit 102 outputs the image data to the feature amount extraction unit 103. The feature amount extraction unit 103 detects a character string, the features of the characters included in the character string, and the coordinates of the range of the character string in the image data by performing the OCR process on the image data (step S1002). The feature amount extraction unit 103 generates third feature amounts including the detected information for each character string in the image data (step S1003). The third feature amounts are information indicating the features of the character string included in the document form of the newly read image data.

Subsequently, the group-specifying unit 107 reads the group second feature amounts used to specify the group of the new document form among the certain group second feature amounts stored on the database 4. The group second feature amounts may be, for example, feature amounts corresponding to the emblem image 502 of the ordering party displayed in the image data of the document form. The group-specifying unit 107 determines whether the information indicated in certain group second feature amounts can be specified from the image data of the document form acquired in step S1001. The group-specifying unit 107 performs a similar process using the group second feature amounts of all the groups.

When the information matching the group second feature amounts read from the database 4 can be specified from the image data of the newly read document form, the group-specifying unit 107 specifies a group that has the group second feature amounts as a group of the image data of the newly read document form (step S1004).

Thereafter, the group-specifying unit 107 reads one group first feature amount or the plurality of group first feature amounts of the group from the database 4 (step S1005). The group-specifying unit 107 outputs the third feature amount and one group first feature amount or the plurality of group first feature amounts to the recording unit 105. The group first feature amount is a feature amount for specifying one recording character string or the plurality of record character strings in the document form belonging to the group.

The recording unit 105 acquires the third feature amount and one group first feature amount or the plurality of group first feature amounts with respect to one character string or the plurality of character strings in the image data. The recording unit 105 determines whether there are all the third feature amounts including the coordinates corresponding to the coordinates indicated by the group first feature amounts by using the coordinates indicating the range of the character string included in each group first feature amount (step S1006). When there are all the third feature amounts including the coordinates corresponding to the coordinates of the group first feature amounts (YES in step S1006), there is description of characters in all the entries in the document form corresponding to the recording character string. Conversely, when there are only some of the third feature amounts including the coordinates corresponding to the coordinates of the group first feature amounts (NO in step S1006), there is no description of the characters in any entry in the document form.

In the case of YES in step S1006, the recording unit 105 determines whether each character attribute included in the group first feature amount matches each character attribute included in the corresponding third feature amount specified based on the coordinates (step S1007).

When the determination result of step S1007 is YES, that is, the character attributes match each other, the recording unit 105 generates a checking screen in which a rectangular frame is displayed in the range of the record character string based on the coordinates indicated by one third feature amount or the plurality of third feature amounts in the currently processed image data. The recording unit 105 outputs the checking screen to a monitor (step S1008).

The operator can check a rectangular region displayed on the checking screen and check a record character string which the image-processing device 1 will record. Thus, the operator can check whether the record character string is insufficient. An icon image of one of OK and NG buttons is displayed on the checking screen. The operator can give an instruction indicating that the selected record character string is not insufficient by selecting the OK button among the icon images of the button. Conversely, the operator can give an instruction indicating that the selected record character string is insufficient by selecting the NG button among the icon images of the button.

The recording unit 105 determines whether the record character string is insufficient in the selection in response to pressing of the icon image of the button by the operator (step S1009). When the record character string is not insufficient, the recording unit 105 records the character strings included in the third feature amounts in the record table in association with identification information of the document form (step S1010).

For example, a case in which the third feature amount a3, the third feature amount b3, the third feature amount c3, and the third feature amount d3 can be acquired from the image data of the document form is an exemplary example. A case in which the third feature amount a3 matches a first feature amount g11 recorded in advance on a database, the third feature amount b3 matches a group first feature amount g12, the third feature amount c3 matches a group first feature amount g13, and the third feature amount d3 matches a group first feature amount g14 is an exemplary example. In this case, the recording unit 105 records the character strings included in the third feature amount a3, the third feature amount b3, the third feature amount c3, and the third feature amount d3 in the record table of the document form.

When step S1006 is NO, step S1007 is NO, or step S1009 is NO, as described above, the recording unit 105 performs a process in a case in which there are no third feature amounts including the coordinates corresponding to the coordinates indicated by the group first feature amounts. Specifically, the recording unit 105 generates input image data of a form image in which input entries are provided in the range of the coordinates of the group first feature amounts for which there are no third feature amounts at the corresponding coordinates in the image data and outputs the input image data to the monitor (step S1011). The input image data may be data described in a markup language such as HTML or XML.

The operator operates an input device such as a keyboard of the image-processing device 1 to input record character strings in the input entries in the input image data displayed on the monitor while seeing the input image data. A save button is displayed in the input image data. When an operation of pressing the save button is performed, the recording unit 105 generates the third feature amounts including the character strings newly input in the input entries of the input image data in addition to the third feature amounts which have already been acquired with regard to the document form (step S1012). The recording unit 105 records the identifier of the form image data and the character string input in the input entries on the database 4 in association therewith.

The image-processing device 1 can extend the range of the character string recorded automatically, since the first feature amounts are updated by re-preforming the processing flow illustrated in FIG. 6. Thus, when the form document is processed subsequently in the same way, the character string is recorded automatically, and thus it is possible to omit the effort required for the operator to input the character string. The recording unit 105 records the character string included in all the third feature amounts in the record table of the document form (step S1013).

Through the process, the image-processing device 1 can automatically record the record character strings in the image data of the document form irrespective of kind of newly input document form in accordance with the record character strings and the image data of the plurality of different document forms recorded in advance by the operator. Accordingly, the image-processing device 1 can reduce the effort required for the operator to record the record character string in the document form.

Even though no record character string is entered in the document form, the image-processing device 1 outputs the input image data when there are no entries corresponding to the record character strings which had to be originally entered. Thus, it is possible to find a mistake which had not been input in the entries of the document form which had to be originally entered and easily record the record character strings indicated by the entries.

The operator is required for work to perform checking work for the grouping when there is no group corresponding to the newly read document form of the image data. Therefore, it is preferable to present the operator at a timing appropriate for the work and instruct the operator to perform the work. For example, the image-processing device 1 first instructs the operator to perform a daily work when the group of the document form is not specified among works for the newly read document form of the image data. Hereinafter, a process in the case of the instruction will be described.

Figure 11:
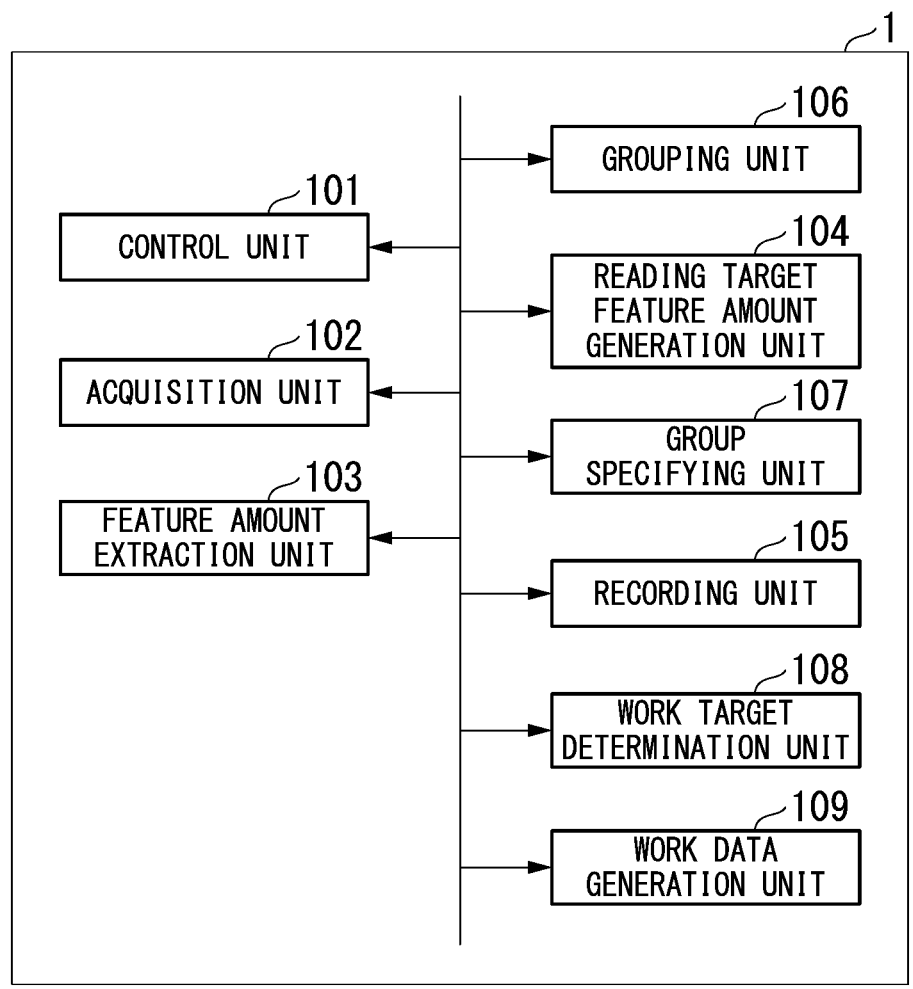
FIG. 11 is a third diagram illustrating a functional block of the image-processing device according to the embodiment according to the present invention.

FIG. 11 is a third diagram illustrating a functional block of the image-processing device according to the embodiment.

The image-processing device 1 further has the functions of a work target determination unit 108 and a work data generation unit 109 in addition to each functional unit illustrated in FIG. 8. A hardware configuration of the image-processing device 1 is similar to the configuration illustrated in FIG. 2.

The image-processing device 1 acquires form image data generated as an optical reading result of a form image and determines whether kinds of groups of the form image data are specifiable. The image-processing device 1 determines that the form image data is the form image data on which checking work for the kinds of groups is necessary when the kinds of groups of the form image data are determined to be unspecifiable. For example, based on a machine learning result of the form image data, the image-processing device 1 determines whether the kinds of groups of the form image data is specifiable.

With regard to the kinds of groups, a group to which a plurality of pieces of form image data are grouped is identified. The kinds of groups are, for example, groups indicating kinds of formats of the form image data. The kinds of groups may be, for example, groups indicating kinds of content of the form image data.

The checking work is a process performed to group the form image data. The checking work is, for example, a process of acquiring information regarding the formats of the form image data. For example, the checking work is a process of acquiring feature amounts related to the formats of the form image data.

The image-processing device 1 generates work data indicating that the form image data on which the checking work is necessary is output to the operator of the form image data before the form image data on which the checking work is unnecessary is output to the operator of the form image data. The work data is, for example, data indicating a procedure of works related to the form image data. Then, the image-processing device 1 groups the kinds of groups to which the form image data on which the checking work is necessary belongs in response to an operation in the checking work by the operator. The image-processing device 1 may group the kinds of groups through a process such as machine learning.

Figure 12:
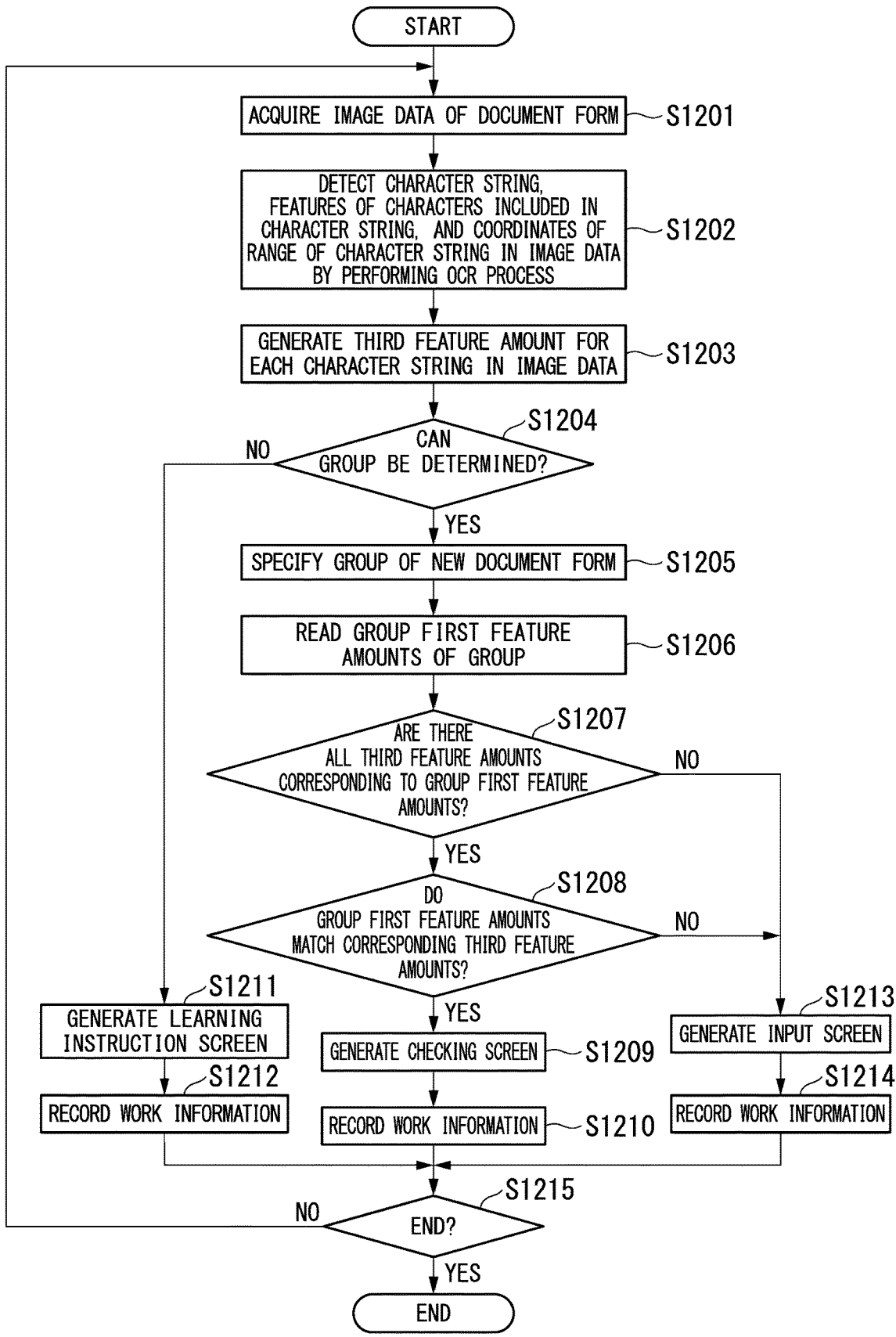
FIG. 12 is a fifth diagram illustrating a processing flow of the image-processing device according to the embodiment according to the present invention.

FIG. 12 is a fifth diagram illustrating a processing flow of the image-processing device according to the embodiment.

As described above, a plurality of combinations of image data of a plurality of different document forms and specific record character strings described in each document form are recorded for each document form on the database 4. For example, a plurality of pieces of specific record character string information of each of the different document forms 5 illustrated in FIG. 4 are assumed to be recorded. In this state, the operator instructs the image-reading device 2 to read many document forms for performing work on a next working day. The operator instructs the image-processing device 1 to process the image data of the document forms read by the image-reading device 2.

Thus, the image-reading device 2 generates the image data of the document forms and outputs the image data to the image-processing device 1. The image-reading device 2 reads many document forms, for example, ten thousand document forms, through nighttime batch processing and instructs the recording device 3 to record the image data generated as the result. The recording device 3 records each piece of image data read and generated through the nighttime batch processing on the database 4.

Then, the acquisition unit 102 of the image-processing device 1 acquires one piece of image data record on the database 4 through the nighttime batch processing (step S1201). The acquisition unit 102 outputs the image data to the feature amount extraction unit 103. The feature amount extraction unit 103 detects the character strings, the features of the characters included in the character strings, and the coordinates of the ranges of the character strings in the image data by performing the OCR process on the image data (step S1202). The feature amount extraction unit 103 generates the third feature amounts including the detected information for each character string in the image data (step S1203). The third feature amounts are information indicating features of a character string included in a document form of newly read image data.

Subsequently, the group-specifying unit 107 reads the group second feature amounts used to specify the group of the new document form among the certain group second feature amounts from the database 4. The group second feature amounts may be, for example, feature amounts corresponding to the emblem image 502 of the ordering party displayed in the image data of the document form.

The group-specifying unit 107 determines whether the information indicated in certain group second feature amounts can be specified from the image data of the document form acquired in step S1201. The group-specifying unit 107 performs a similar process using the group second feature amounts for all the groups. Then, the group-specifying unit 107 determines that the information matching the group second feature amounts read from the database 4 can be specified from the image data of the newly read document form. The group-specifying unit 107 determines the group of the image data of the newly read document form (step S1204).

A process in a case in which the information matching the group second feature amounts read from the database 4 can be specified from the image data of the newly read document form and thus the group can be determined (YES in step S1204) will be described. In this case, the group-specifying unit 107 specifies the group having the group second feature amounts as a group of the image data of the newly read document form (step S1205). The group-specifying unit 107 generates a group determination result indicating that the group of the image data of the newly read document form can be determined. The process of the group-specifying unit 107 is an aspect of process of determining whether the kind of group of the image data can be specified based on a machine learning result of the image data of the document form.

Thereafter, the group-specifying unit 107 reads one group first feature amount or the plurality of group first feature amounts of the group from the database 4 (step S1206). The group-specifying unit 107 outputs the third feature amount and one group first feature amount or the plurality of group first feature amounts to the recording unit 105. The group first feature amount is a feature amount for specifying one record character string or the plurality of record character strings in the document form belonging to the group.

The recording unit 105 acquires the third feature amount and one group first feature amount or the plurality of group first feature amounts with respect to one character string or the plurality of character strings in the image data. The recording unit 105 determines whether there are all the third feature amounts including the coordinates corresponding to the coordinates indicated by the group first feature amounts by using the coordinates indicating the range of the character string included in each group first feature amount (step S1207). When there are all the third feature amounts including the coordinates corresponding to the coordinates of the group first feature amounts (YES in step S1207), there is description of characters in all the entries in the document form corresponding to the recording character string. Conversely, when there are only some of the third feature amounts including the coordinates corresponding to the coordinates of the group first feature amounts (NO in step S1207), there is no description of the characters in any entry in the document form.

In the case of YES in step S1207, the recording unit 105 determines whether each character attribute included in the group first feature amount matches each character attribute included in the corresponding third feature amount specified based on the coordinates (step S1208).

When the determination result of step S1208 is YES, that is, the character attributes match each other, the recording unit 105 generates a checking screen in which a rectangular frame is displayed in the range of the record character string based on the coordinates indicated by one third feature amount or the plurality of third feature amounts in the currently processed image data (step S1209). The recording unit 105 records work information in which the checking screen, a group determination result, the image data of the document form, and a document form ID are associated on the database 4 (step S1210).

When step S1204 is NO, as described above, that is, the group cannot be determined, the group-specifying unit 107 generates a group determination result indicating that the group of the image data of the newly read document form cannot be determined. Then, the recording unit 105 generates a learning instruction screen used by the operator for causing to learn the document form of which the group cannot be determined (step S1211). The recording unit 105 records work information in which the learning instruction screen, the group determination result, the image data of the document form, and the document form ID are associated on the database 4 (step S1212).

When step S1207 is NO or step S1208 is NO, as described above, the recording unit 105 performs a process in a case in which there are no third feature amounts including the coordinates corresponding to the coordinates indicated by the group first feature amounts. Specifically, the recording unit 105 generates an input screen for a form image in which input entries are provided in the range of the coordinates of the group first feature amounts for which there are no third feature amounts at the corresponding coordinates in the image data (step S1213). Then, the recording unit 105 records work information in which the input screen, the group determination result, the image data of the document form, and the document form ID are associated together on the database 4 (step S1214).

The acquisition unit 102 determines whether the process ends based on whether to read the image data of all the document forms recorded in the nighttime batch processing (step S1215). The process ends when acquisition unit 102 reads the image data of all the document forms. Conversely, when the acquisition unit 102 does not read the image data of all the document forms, the process from step S1201 is repeated.

Figure 13:
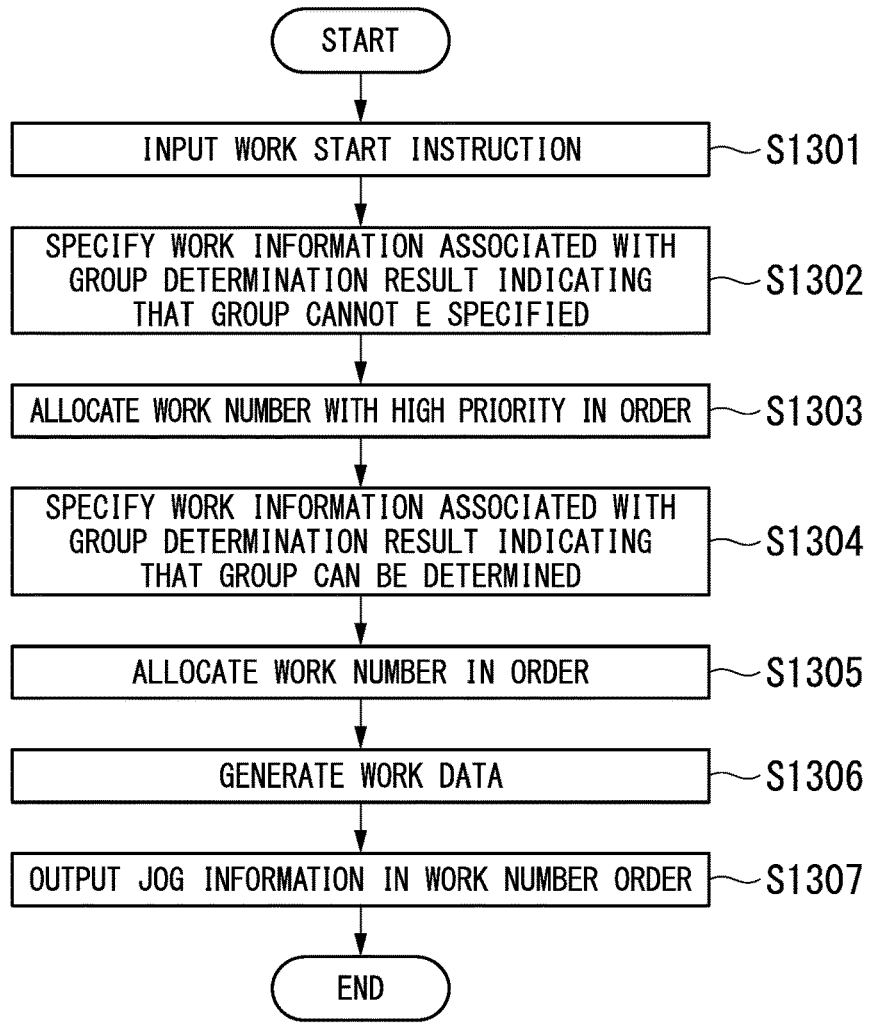
FIG. 13 is a sixth diagram illustrating a processing flow of the image-processing device according to the embodiment according to the present invention.

FIG. 13 is a sixth diagram illustrating a processing flow of the image-processing device according to the embodiment.

The operator performs work using work information accumulated in the database 4 at night through nighttime batch processing. First, the image-processing device 1 inputs a work start instruction by the operator (step S1301).

The work target determination unit 108 of the image-processing device 1 specifies work information associated with a group determination result indicating that the group cannot be determined among the work information recorded on the database 4 through the nighttime batch processing (step S1302). The process of the work target determination unit 108 is an aspect of process of determining work information necessary for the checking work for the kind of group. The work target determination unit 108 allocates a work number with high priority in order to the work information associated with the group determination result indicating that the group cannot be determined (step S1303).

Subsequently, the work target determination unit 108 specifies the work information associated with the group determination result indicating that the group can be determined (step S1304). The work target determination unit 108 allocates a work number with lower priority than the work information associated with the group determination result indicating that the group cannot be determined, in order to the work information associated with the group determination result indicating that the group can be determined (step S1305).

The work target determination unit 108 specifies the work information generated after NO is determined in step S1207 or S1208 among the work information associated with the group determination result indicating that the group can be determined. The work target determination unit 108 may allocate the work number of the work information so that the priority is higher than that of the work number of the other work information of which the group can be determined.

Through the foregoing process, it is possible to allocate the work number with high priority to the work information on which learning of the document form is necessary in accordance with the result indicating that the group cannot be determined. The work number with high priority can be allocated to the work information that require input by the operator among the work information on which the group can be determined.

The work target determination unit 108 may output the work information associated with the group determination result indicating that the group cannot be determined to a terminal of an operator in a predetermined time. For example, the work target determination unit 108 may set an output time in work information with high priority and allocate the output order based on the output time to the work information.

The work data generation unit 109 generates work data in which the work information recorded on the database 4 through the nighttime batch process is output to the terminal used by the operator in a work number order (step S1306). Based on the work data, the work data generation unit 109 outputs the work information in the work number order in response to an operation by the operator (step S1307).

Thus, the learning instruction screen for the document form on which the group cannot be determined is first output as work information to the terminal used by the operator. A learning start button is displayed on the learning instruction screen. When the operator presses the learning start button, the grouping process is performed based on machine learning of the document form through the processes of steps S901 to S916 described above.

The work data generation unit 109 outputs the input image generated in step S1213 to the terminal of the operator based on the work number. The input image data may be data described in a markup language such as HTML or XML. The operator operates an input device such as a keyboard of the image-processing device 1 to input record character strings in the input image data displayed on the monitor in the input entries while seeing the input image data. A save button is displayed in the input image data. When an operation of pressing the save button is performed, the recording unit 105 generates the third feature amounts including the character strings newly input in the input entries of the input image data in addition to the third feature amounts which have already been acquired with regard to the document form. The recording unit 105 records the identifier of the form image data and the character string input in the input entries on the database 4 in association therewith. The image-processing device 1 can extend the range of the character string recorded automatically, since the first feature amounts are updated by re-preforming the processing flow illustrated in FIG. 6.

Thus, when the form document is processed subsequently in the same way, the character string is recorded automatically, and thus it is possible to omit the effort necessary for the operator to input the character string. The recording unit 105 records the character string included in all the third feature amounts in the record table of the document form.

The work data generation unit 109 outputs the checking screen generated in step S1209 to the terminal of the operator based on the work number. The operator can check a rectangular region displayed on the checking screen and check a record character string which the image-processing device 1 will record. Thus, the operator can check whether the record character string is insufficient. An icon image of one of OK and NG buttons is displayed on the checking screen. The operator can give an instruction indicating that the selected record character string is not insufficient by selecting the OK button among the icon images of the button. Conversely, the operator can give an instruction indicating that the selected record character string is insufficient by selecting the NG button among the icon images of the button.

The recording unit 105 determines whether the record character string is insufficient in the selection in response to pressing of the icon image of the button by the operator. When the record character string is not insufficient, the recording unit 105 records the character strings included in the third feature amounts in the record table in association with identification information of the document form.

For example, a case in which the third feature amount a3, the third feature amount b3, the third feature amount c3, and the third feature amount d3 can be acquired from the image data of the document form is an exemplary example. A case in which the third feature amount a3 matches a group first feature amount g11 recorded in advance on a database, the third feature amount b3 matches a group first feature amount g12, the third feature amount c3 matches a group first feature amount g13, and the third feature amount d3 matches a group first feature amount g14 is an exemplary example. In this case, the recording unit 105 records the character strings included in the third feature amount a3, the third feature amount b3, the third feature amount c3, and the third feature amount d3 in the record table of the document form.

In the above-described process, the work data generation unit 109 may allocate the work number with high priority to only work information corresponding to the image data of the number of document forms necessary for machine learning among the work information associated with the group determination result indicating that the group cannot be determined. For example, when the number of work information associated with the group determination result indicating that the group cannot be determined is 1000, the work number with high priority can be allocated to only 20 pieces of work information necessary for the machine learning among the work information. Based on the machine learning of the document forms through the processes of steps S901 to S916 described above, the grouping process may be formed automatically on the remaining 980 pieces of work information without the checking of the operator.

Specifically, the work data generation unit 109 detects the number of pieces of work information associated with the work number with high priority indicating that the group cannot be determined. When the number of pieces of detected work information is greater than a number necessary for the machine learning, the work data generation unit 109 determines the number necessary for the machine learning of the grouping. The number may be a value known in advance by the work data generation unit 109 or may be a value determined in accordance with an identifier, a learning item, or the like of the document form which is a work target as the work information. The work data generation unit 109 outputs the learning instruction screen of the number of pieces of work information necessary for the machine learning of the grouping to the terminal of the operator in the work number order in response to an operation of the operator. The work data generation unit 109 can reduce the checking work by the operator by reducing the number of times the learning instruction screen output to the terminal of the operator is output through the process.

The work data generation unit 109 may group the work information for each difference in the identifier or a learning item of the document form which is a work target and determine a number necessary for the machine learning of the grouping for each grouping unit. In this case, the work data generation unit 109 outputs the number of pieces of work information necessary for the machine learning of the grouping to the terminal of the operator in order of the work number for each grouping unit.

For example, a case in which 1000 pieces of work information include 500 pieces of work information insufficient for the machine learning in an item B1 of a form image and 500 pieces of work information insufficient for the machine learning in an item B2 of the form image is an exemplary example. The work data generation unit 109 outputs work numbers of 20 pieces of work information necessary for the machine learning of the grouping among the work information insufficient for the machine learning in the item B1 of the form image and 20 pieces of work information necessary for the machine learning of the grouping among the work information insufficient for the machine learning in the item B2 of the form image as work information with highest priority in order.

As another example of the process of the image-processing device 1, the operator may register a group of document forms beforehand in the image-processing device 1. For example, when the operator registers the image data of the document forms in the past, the operators inputs group identifiers in accordance with the kinds of document forms to register the group identifiers in association with the image data of the document forms on the database 4 beforehand. Then, different kinds of forms are not mixed due to a mistake or the like of the process of the image-processing device 1 in the same group, and thus the first feature amounts can be extracted with high precision. In this case, at the time of registration the operator inputs the group of the document form, the operator specifies a group of a new form using the second feature amounts as in step S1004.

As still another example of the process of the image-processing device 1, the image-processing device 1 may group the document forms by using the second feature amounts but also group the document forms by using the first feature amounts or the first feature amounts with the second feature amounts. The first feature amounts are the record character string, but the coordinates of the record character string or the character attributes are considered to be the same as long as the document forms are the same kind of document forms, and thus the forms can be grouped using the first feature amounts. The operator can read the record character string with high precision in an OCR process.

In this case, the acquisition unit 102 acquires the image data of a plurality of pieces of form image data and record character strings which are recording targets among the character strings included in the form image data. Then, the grouping unit 106 groups the form image data based on the first feature amounts. The reading target feature amount generation unit 104 generates reading target feature amounts of the record character string of each group using the first feature amounts corresponding to the form image data included in the group.

The group of the new form is specified based on the second feature amount in step S1004 described above. However, as another processing mode, the image-processing device 1 specifies all the groups set by the operator in order for each group, reads the first feature amounts, and counts the number of feature amounts matching the third feature amounts without performing a process of specifying the group. In the case of a correct group, the most first feature amounts ought to match the most third feature amounts. Therefore, the image-processing device 1 records the character string included in the third feature amounts of a specific group in step S1008 when the number of feature amounts matching each other is the most. Thus, even when no group is specified, the record character string can be recorded.

In the case, the acquisition unit 102 acquires the image data of a plurality of pieces of form image data and record character strings which are recording targets among the character strings included in the form image data. Then, the feature amount extraction unit extracts the first feature amounts indicating features of the record character string or the second feature amounts indicating recognition information other than the record character string based on the recognition result for the form image data acquired by the acquisition unit 102. The reading target feature amount generation unit 104 generates the reading target feature amounts of the record character string for each group using at least one of the first feature amounts and the second feature amounts corresponding to the form image data included in a predetermined group set in advance.

Figure 14:
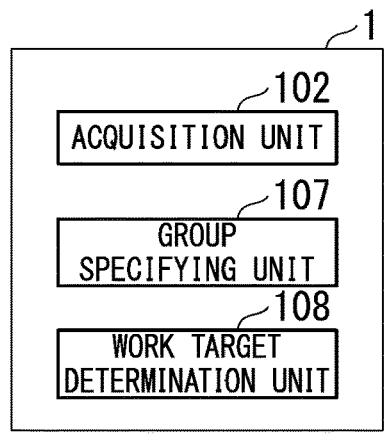
FIG. 14 is a diagram illustrating a minimum configuration of the image-processing device according to the embodiment according to the present invention.

FIG. 14 is a diagram illustrating a minimum configuration of the image-processing device.

As illustrated in the drawing, the image-processing device 1 may include at least the acquisition unit 102, the group-specifying unit 107, and the work target determination unit 108.

The acquisition unit 102 acquires form image data generated as an optical reading result of a form image.

The group-specifying unit 107 determines whether kinds of groups into which the form image data is grouped are specifiable.

The work target determination unit 108 determines that the form image data is the form image data on which checking work for the kinds of groups is necessary when the kinds of groups of the form image data are determined to be unspecifiable.

Each device described above contains a computer system. A program causing each device to perform each process described above is stored in a computer-readable recording medium of the device. Thus, a computer of each device executes the program to perform the above process. Here, the computer-readable recording medium is a magnetic disk, a magneto-optic disc, a CD-ROM, a DVD-ROM, a semiconductor memory, or the like.

The computer program may be delivered to a computer via a communication line and the computer receiving the computer program may execute the program.

The program may be a program that realizes some of the functions of the above-described processing units. Further, the above-described functions may be so-called differential files (differential programs) that are realized in combination with programs which have already been recorded on a computer system.

Priority is claimed on Japanese Patent Application No. 2018-071146, filed Apr. 2, 2018, the content of which is incorporated herein by reference.

INDUSTRIAL APPLICABILITY

According to the present invention, it is possible to output the work for checking an image of a form of which a group cannot be specified as work to be preliminarily performed by the operator.

REFERENCE SIGNS LIST

1 Image processing device
2 Image reading device
3 Recording device
4 Database
5 Document form
101 Control unit
102 Acquisition unit
103 Feature amount acquisition unit
104 Reading target feature amount generation unit
105 Recording unit
106 Grouping unit
107 Group specifying unit
108 Work target determination unit
109 Work data generation unit

The invention claimed is:

1. An image-processing device comprising:
at least one memory configured to store instructions; and
at least one processor configured to execute the instructions to:
receive specification of a plurality of kinds of groups, each kind of group including a group second feature amount of attributes and coordinates of non-recorded character strings of a plurality of pieces of form image data belong to the each kind of group;
for each of a plurality of form images,
  acquire form image data generated by performing optical character recognition (OCR) on the form image, the form image data including a recorded character string that is a target of being recorded in the at least one memory and a non-recorded character string that is not the target of being recorded in the at least one memory;
  determine whether the acquired form image data of the form image includes the group second feature amount of any of the kinds of groups;
  identify that the acquired form image data of the form image has not been specified as belonging to any of the kinds of groups in response to determining that the acquired form image data does not include the group second feature image of any of the kinds of groups;
identify that the acquired form image data of the form image has been specified as belonging to any of the kinds of groups in response to determining that the acquired form image data includes the group second feature image of any of the kinds of groups;
specify the acquired form image data of each form image that has not been specified as belonging to any of the kinds of groups as having higher priority than the acquired form image data of each form image that has been specified as belonging to any of the kinds of groups;
for the acquired form image data of each form image having the higher priority,
  output the recorded character string of the acquired form image data to an operator for sufficiency;
  receive input from the operator as to whether the recorded character string is sufficient or insufficient;
  in response to the input indicating that the recorded character string is insufficient, perform further processing on the form image; and
  in response to the input indicating that the recorded character string is sufficient, do not perform further processing on the firm image.

2. The image-processing device according to claim 1, wherein
whether the acquired form image data includes the group second feature amount of any of the kinds of groups is based on a machine learning result of the plurality of pieces of form image data.

3. The image-processing device according to claim 1, wherein the at least one processor is further configured to execute the instructions to:
generate work data regarding a work process related to the form image data, the work data indicating that the form image data on which checking work is required is output to a terminal used by the operator, before the form image data on which the checking work is not required is output to the terminal.

4. The image-processing device according to claim 3, wherein the at least one processor is configured to execute the instructions to:
generate the work data in which a priority of the form image data on which the checking work is required is higher than the priority of the form image data on which the checking work is not required.

5. The image-processing device according to claim 3, wherein the at least one processor is further configured to execute the instructions to:
group the form image data to the kinds of groups on which the checking work is required in response to an operation in the checking work by the operator.

6. The image-processing device according to claim 3, wherein the at least one processor is configured to execute the instructions to:
determine a number of pieces of the form image data necessary for analysis of feature amounts, and generate the work data indicating that the determined number of pieces of form image data is output to the operator.

7. An image processing method comprising:
receiving, by a processor, specification of a plurality of kinds of groups, each kind of group including a group second feature amount of attributes and coordinates of non-recorded character strings of a plurality of pieces of form image data belong to the each kind of group;
for each of a plurality of form images,
  acquiring, by the processor, form image data generated by performing optical character recognition (OCR) on the form image, the form image data including a recorded character string that is a target of being recorded in the at least one memory and a non-recorded character string that is not the target of being recorded in the at least one memory;
  determining, by the processor, whether the acquired form image data of the form image includes the group second feature amount of any of the kinds of groups;
  identifying, by the processor, that the acquired form image data of the form image has not been specified as belonging to any of the kinds of groups in response to determining that the acquired form image data does not include the group second feature image of any of the kinds of groups;
  identifying, by the processor, that the acquired form image data of the form image has been specified as belonging to any of the kinds of groups in response to determining that the acquired form image data includes the group second feature image of any of the kinds of groups;
specifying, by the processor, the acquired form image data of each form image that has not been specified as belonging to any of the kinds of groups as having higher priority than the acquired form image data of each form image that has been specified as belonging to any of the kinds of groups;
for the acquired form image data of each form image having the higher priority,
outputting, by the processor, the recorded character string of the acquired form image data to an operator for sufficiency;
receiving, by the processor, input from the operator as to whether the recorded character string is sufficient or insufficient;
in response to the input indicating that the recorded character string is insufficient, performing, by the processor, further processing on the form image; and in response to the input indicating that the recorded character string is sufficient, not performing, by the processor, further processing on the firm image.

8. A non-transitory computer-readable storage medium storing a program executable by a computer to perform processing comprising:
receiving specification of a plurality of kinds of groups, each kind of group including a group second feature amount of attributes and coordinates of non-recorded character strings of a plurality of pieces of form image data belong to the each kind of group;
for each of a plurality of form images,
acquiring form image data generated by performing optical character recognition (OCR) on the form image, the form image data including a recorded character string that is a target of being recorded in the at least one memory and a non-recorded character string that is not the target of being recorded in the at least one memory;
determining whether the acquired form image data of the form image includes the group second feature amount of any of the kinds of groups;
identifying that the acquired form image data of the form image has not been specified as belonging to any of the kinds of groups in response to determining that the acquired form image data does not include the group second feature image of any of the kinds of groups;
identifying that the acquired form image data of the form image has been specified as belonging to any of the kinds of groups in response to determining that the acquired form image data includes the group second feature image of any of the kinds of groups;
specifying the acquired form image data of each form image that has not been specified as belonging to any of the kinds of groups as having higher priority than the acquired form image data of each form image that has been specified as belonging to any of the kinds of groups;
for the acquired form image data of each form image having the higher priority,
outputting the recorded character string of the acquired form image data to an operator for sufficiency;
receiving input from the operator as to whether the recorded character string is sufficient or insufficient;
in response to the input indicating that the recorded character string is insufficient, performing further processing on the form image; and
in response to the input indicating that the recorded character string is sufficient, not performing further processing on the firm image.

9. The image-processing device according to claim 1, wherein the at least one processor is further configured to execute the instructions to:

group the plurality of pieces of form image data based on second feature amounts, including the attributes and the coordinates of the non-recorded character strings, into the plurality of kinds of groups; and
generate the group second feature amount as an average of the second feature amounts of the plurality of pieces of form image data belonging to each of the plurality of kinds of groups.

10. The image-processing device according to claim 1, wherein the at least one processor is further configured to execute the instructions to:
generate a group first feature amount as an average of first feature amounts, including attribute and coordinates of the recorded character string, of the plurality of pieces of form image data belonging to each of the plurality of kinds of groups; and
determine whether or not the acquired form image data has a third feature amount corresponding to the coordinates of the recorded character string included in the group first feature amount of the kind of groups for which the group second feature amount has been identified, the third feature amount including the attribute and the coordinates of the recorded character string of the acquired form image data.

11. The image-processing device according to claim 10, wherein the at least one processor is further configured to execute the instructions to:
determine, when there is the third feature amount corresponding to the coordinates of the the recorded character string included in the group first feature amount, whether or not the attribute of the recorded character string included in the group first feature amount matches the attribute of the recorded character string included in the third feature amount.

12. The image-processing device according to claim 10, wherein the at least one processor is further configured to execute the instructions to:
generate and record a screen image of the acquired form image data that has an input entry in a range of the coordinates where there is no corresponding third feature amount of the character string in the acquired form image data.

13. The image-processing device according to claim 1, wherein the at least one processor is further configured to execute the instructions to:
group the plurality of pieces of form image data into the plurality of kinds of groups, based on correlation or similarity of second feature amounts, including the attributes and the coordinates of the non-recorded character strings, between the plurality of pieces of form image data.

\* \* \* \* \*